May 27, 1952  R. T. CLOUD  2,598,355

PENDULUM COMPENSATED SURVEYING INSTRUMENT

Filed Sept. 13, 1946  5 Sheets-Sheet 1

INVENTOR.
R. T. Cloud
BY J. Vincent Martin
Ralph A. Browning
James B. Simmel
attorneys May 27, 1952 R. T. CLOUD 2,598,355
PENDULUM COMPENSATED SURVEYING INSTRUMENT
Filed Sept. 13, 1946 5 Sheets-Sheet 2

INVENTOR.
R. T. Cloud
BY J. Vincent Martin
Ralph R. Browning
James B. Simms
ATTORNEYS

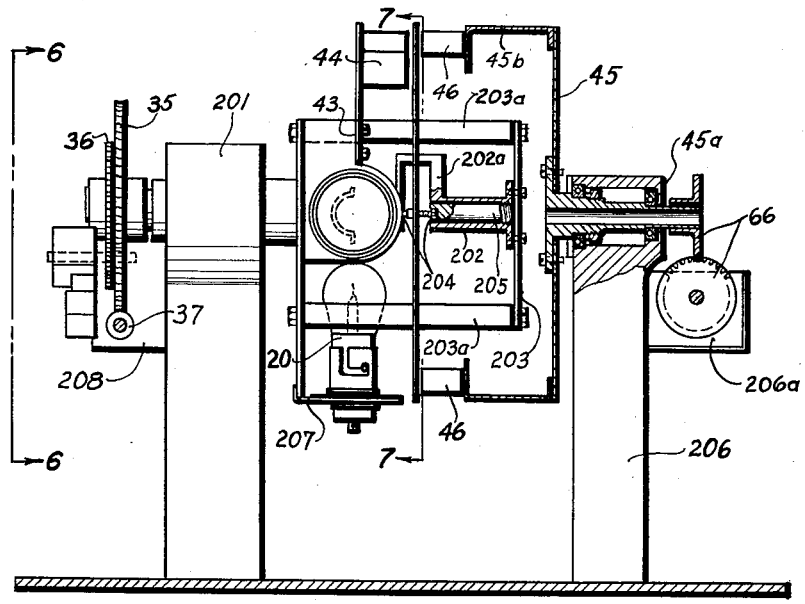
Fig. 5
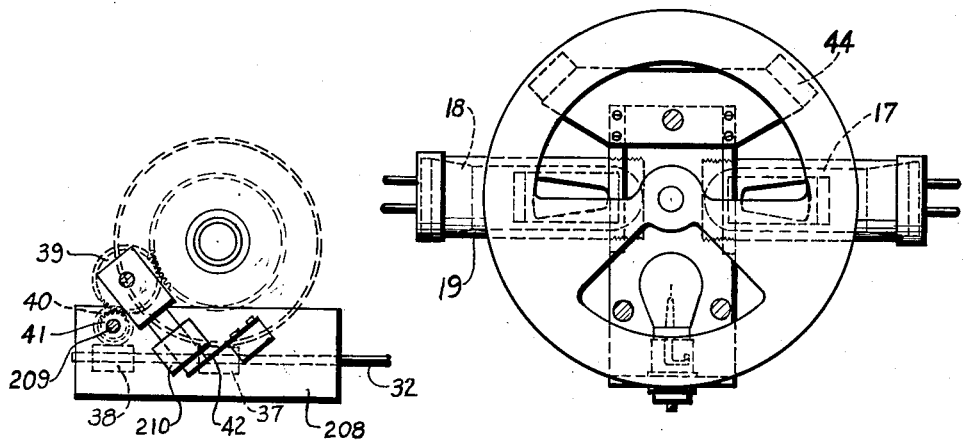
Fig. 6
Fig. 7

Patented May 27, 1952

2,598,355

UNITED STATES PATENT OFFICE 2,598,355

PENDULUM COMPENSATED SURVEYING INSTRUMENT

Raymond T. Cloud, Houston, Tex., assignor to North American Geophysical Co., Houston, Tex., a corporation of Texas Application September 13, 1946, Serial No. 696,739

4 Claims. (Cl. 33—220)

This invention relates to improvements in surveying instruments and refers more particularly to apparatus for determining and recording differential elevations between points on the earth's surface traversed by a vehicle.

The fundamental principle involved is that of measuring the distance traversed by means of an odometer which may be attached to a wheel of the vehicle and the instantaneous angle of the vehicle relative to the horizontal. This latter is accomplished by means of a pendulum under the influence of gravity. The difference in elevation is then:

$$E = k \int_0^{s_1} \sin \phi \, ds$$

where:

$E$ = difference in elevation
$k$ = constant of apparatus
$\phi$ = angle of terrain
$s$ = distance traversed Heretofore apparatus for accomplishing this have not been entirely satisfactory. No difficulty has been encountered in the measurement of distance. However, the measurement of the instantaneous angle of the vehicle with the accuracy necessary to provide a device having an accuracy of plus or minus six inches (6") to the mile has presented difficulties not heretofore satisfactorily solved. To provide satisfactory mechanism of the type employing a pendulum to measure the angle the measurement of the angle must be with an accuracy in the neighborhood of one-third (⅓) of a degree or about twenty (20) seconds of arc.

Some of the features which contribute to the difficulties involved in the measurement of the angle when the apparatus is mounted on the floor of an ordinary spring suspended car body are enumerated below:

1. The pendulum may deviate from the perpendicular due to the acceleration or deceleration of the car's motion in a forward direction.

2. The solid friction of the pendulum's bearings may cause the pendulum to deviate from a true perpendicular position.

3. The spring suspension of the car body changes and introduces an error into the apparatus as the angle of the body relative to the horizontal does not represent true angle encountered by the automobile tires.

(a) Detention by friction of leaf springs or shock absorbers.

(b) Unequal distribution of the vehicle load due to shift of driver's position, extra passengers, or other articles placed on or removed from the car, as well as the difference in the weight of gasoline carried in the car tank.

(c) The effect of wind upon the car body.

It is the general object of the present invention to eliminate the difficulties heretofore encountered and to this end there is provided a novel apparatus which will be explained in the following description and includes different embodiments suitable for carrying the invention into effect.

More specifically, an object of the invention is to provide a suitable pendulum in the form of a disc having unsymmetrical cut-away portions.

Another object is to provide a mounting for the pendulum such that the pendulum is free to hang true to the perpendicular as the vehicle angle of inclination varies.

A further object is to provide means for rotating the support from which the pendulum is suspended, about an axis aligned with the pendulum suspension, the rotation being relative to the vehicle and in substantial unison with the pendulum.

Still another object is to provide a pendulum support which is rotatable in unison with the pendulum wherein the support carries a means for imposing a magnetic flux about the pendulum rim to retard vibration and oscillation of the pendulum.

Still a further object is to provide in an apparatus of the character described, a means for applying forces to the pendulum which are equal and opposite in direction to those imparted to the pendulum by variations in vehicle acceleration.

Yet another object is to provide apparatus of the character described which may have a spring mounting on a vehicle and means for compensating for the angle between the unsprung vehicle chassis and the cushion mounting.

Yet a further object is to provide in an apparatus of the character described, means for rendering the apparatus ineffective when the angle encountered by the vehicle or the speed of the vehicle exceeds predetermined limits together with means for notifying the operator when this occurs.

Even another object is to provide a large scale saw-tooth type recording of the elevation variations along the path of the vehicle.

Other and further objects will appear from the following description.

In the accompanying drawings, which form a part of the instant specification and are to be read in conjunction therewith and where like reference numerals are used to indicate like parts in the various views, Fig. 1 is a perspective schematic view illustrating the principle of an embodiment of the invention;

Fig. 5 is a view taken along the line 5—5 in Fig. 2 in the direction of the arrows;

Fig. 6 is a view taken along the line 6—6 in Fig. 5 in the direction of the arrows;

Fig. 7 is a view taken along the line 7—7 in Fig. 5 in the direction of the arrows;

Figures 1, 12:
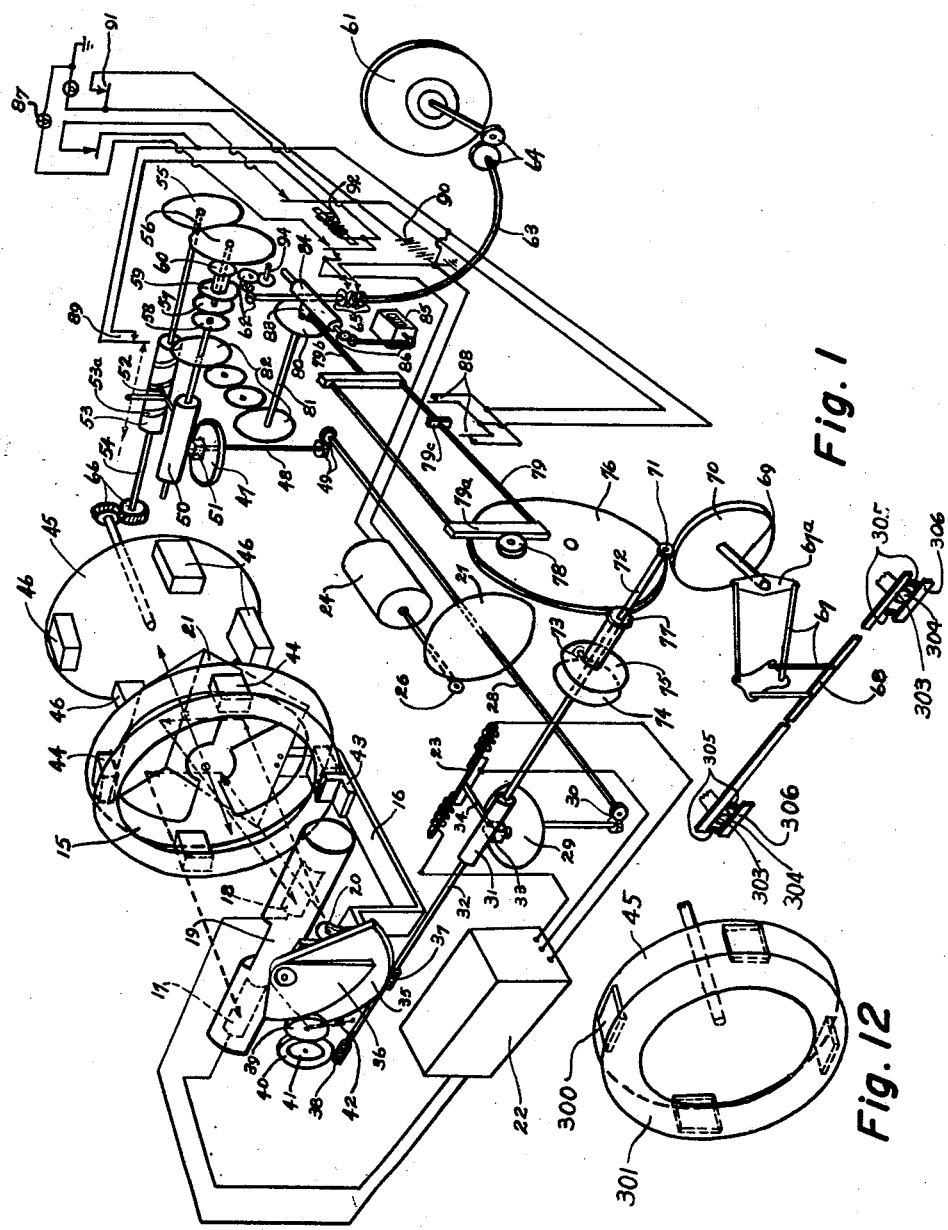
Fig. 12 is a schematic view of a modified type of acceleration compensator impeller element.

It is believed that the apparatus of this invention may be more readily understood by first referring to the schematic drawing of Fig. 1, which illustrates the principle of the invention, and considering the component parts thereof. The apparatus may be considered as comprised of the following component parts:

The pendulum and the follow-up system from which the pendulum is suspended with the means for rotating the follow-up support arm in unison with the pendulum;

An acceleration compensator or the means for imposing upon the pendulum a force equal and opposite to that imparted to the pendulum by acceleration and deceleration of the vehicle;

An angle correction device including a parallel arm straight line mechanism whereby a differential angle between the base of the apparatus and a bar or unsprung vehicle chassis is added or subtracted, as the case may be, so the direct angle is introduced into the sine converter.

Figures 9, 10:
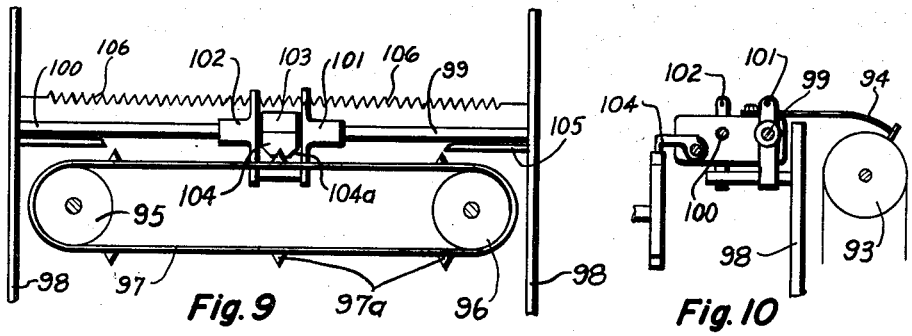
Fig. 9 is a side elevational view of a recording assembly constituting a part of this invention.
Fig. 10 is an end view of the assembly shown in Fig. 9.
Figure 11:
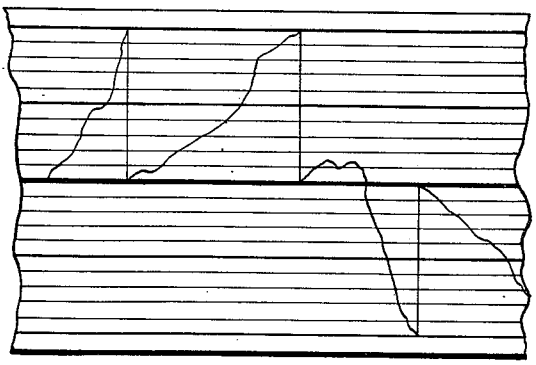
Fig. 11 is a fragmentary plan view illustrating the form of the chart drawn by the assembly shown in Figs. 9 and 10.

The sine converter which is connected to the drive for the follow-up system and the unsprung vehicle chassis and which is effective to convert the true angle into the sine thereof;

The integration mechanism or means for integrating the sine of the true angle times the differential of the distance traveled between selected limits;

The limit switches which control operation of the device de-energizing the device and energizing an alarm when the angle encountered by the vehicle or the speed of the vehicle exceeds predetermined limits; and The charting mechanism for plotting the elevation variance against distance traveled as detailed in Figs. 9, 10 and 11 of the drawings.

Referring to the drawings, the invention will be discussed in detail. In the discussion each of the major component parts of the apparatus will for convenience be considered separately.

*Pendulum and follow-up system*

In the apparatus of this invention the pendulum 15 may be considered as the real heart thereof and remains in a vertical position whereby the center of mass remains directly below the center of suspension at all times, thus, the vertical acceleration imposed by the car motions produce no turning moment about the axis of the pendulum.

This may be accomplished by mounting the pendulum upon a follow-up arm or support which is rotatably mounted. The axis of rotation of the follow-up arm and the axis of oscillation of the pendulum must be in alignment. This mounting is essential to proper functioning of the device. By this expedient the torsion wires or the ball bearings which suspend the pendulum serve merely to measure the instantaneous deviation of the pendulum from the follow-up arm. On the other hand if the pendulum were suspended from the main frame of the device this deviation would be much greater, as it would be the angle of deviation between the pendulum and the vehicle. Inasmuch as the follow-up arm moves in substantial unison with the pendulum the torsion of the wire or the friction of the ball bearings, as the case may be, is substantially eliminated. When the ball bearings are used the proper relation of the inner and outer races to each other is assured whereby the true normal or vertical position of the pendulum may be maintained. In both cases this is important. Otherwise, the residual torsion in the wire would cause a deviation of the pendulum from the vertical. In the case of ball bearings even the most perfect precision ball bearings available have slight irregularities which in operation results in an angular deviation of the pendulum from the vertical position.

The center of suspension of pendulum 15 is along the line indicated by the arrows and is aligned with the axis of rotation of follow-up arm or support 16. The pendulum may be suspended by a torsion wire, ends of which are anchored to support 16 or may be carried by ball bearings supported by arm 16. Rotation of arm 16 with the pendulum is accomplished by the photo-electric cell assembly including cells 17 and 18 mounted in carrier 19. Light from lamp 20, as indicated by the dotted lines, passes through the lower cut-away portion of pendulum 15, is reflected by mirrors 21, also mounted on the support 16, through the upper cut-away portion to the photo-cells. In the position shown in Fig. 1 approximately half of each cell is exposed to the reflected light imparting an equal electric potential to the cells. Obviously when pendulum 15 rotates relative to the follow-up system an unequal distribution of the light results in a potential differential which is accentuated by amplifier 22. The accentuated potential energizes a servomotor shown in the form of the solenoid 23.

The solenoid or servomotor controls the drive mechanism for rotating the follow-up arm to the position of equilibrium with respect to the photo cells. The drive mechanism includes the constant speed motor 24. The motor arbor carries a pinion gear 26 which meshes with gear 27 keyed to shaft 28. Shaft 28 rotates disc 29 at a constant speed by virtue of the spiral gear assembly 30. Mounted above disc 29 is a roller 31 keyed to shaft 32. Ball cage 33 positioned between disc 29 and roller 31 carries two balls in frictional engagement with one another and the lower ball frictionally engages disc 29 and the upper ball frictionally engages roller 31. Thus with cage 33 located at the center of disc 29 no movement is imparted to roller 31. However, shifting of the cage 33 to either side of the center of the disc results in rotation of roller 31 and shaft 32. The speed and direction of rotation are dependent upon the position of the ball cage. The ball cage is carried at the end of rod 34 connected to the solenoid and its position is thus dependent upon the position of the follow-up arm and photo cells relative to the pendulum 15.

A novel anti-backlash gear system is utilized to rotate the follow-up arm 16. This system comprises gear members 35 and 36 having arcuate gear surfaces. The gears are each keyed to the rotational axis of the follow-up arm. Gear 35 meshes with worm 37 keyed to shaft 32 and serves to rotate the follow-up system in one direction. Gear 36 is inter-connected with worm 38 at the end of shaft 32 through gears 39, 40 and 41. Gears 40 and 41 are inter-connected for rotation at the same rate and gear 40 meshes with worm 38. Gear 39 is held in meshing engagement with gears 41 and 36 by spring 42. This latter gear arrangement is effective to rotate the follow-up system when the direction of rotation of shaft 32 is reversed. This arrangement eliminates the backlash encountered in conventional worm gear arrangements.

It will be seen that the arrangement of the pendulum and follow-up system is such that the support arm 16 is rotated substantially in unison with pendulum 15 relative to the instrument case, not shown in the drawings, substantially eliminating any detention that would be otherwise encountered by either the friction in the bearings constituting the pendulum suspension or the inherent springiness of the wire in the event a torsion suspension of the pendulum is used.

Obviously the pendulum in this condition would be free to move and would enter into an oscillation in accordance with its period. This oscillation is retarded to considerable extent by the selection of the particular pendulum of this type which has a long period. However, it is necessary to further dampen the tendency for oscillation. This may be accomplished by imposing a magnetic flux about the rim of the pendulum. Spider 43 mounted on support 16 carries the permanent magnets 44 adjacent the pendulum rim for this purpose.

*Acceleration compensator*

The pendulum is required to remain in a vertical position under the acceleration force of gravity, however, as the vehicle carrying this apparatus is accelerated or decelerated a force due to this movement is imparted to the pendulum at right angles to the earth's gravitational force. The resultant force causes the pendulum to deviate from the true vertical during acceleration or deceleration of the vehicle. One method of compensation has been disclosed in United States Letters Patent 2,362,616. The patented compensator depends upon a condenser and for this reason is not entirely satisfactory inasmuch as large high grade condensers are required and in even the best condensers there is a soaking up effect whereby the condenser serves as a galvanic battery and the resultant currents are not proportional to the vehicle acceleration.

According to this invention the compensating force is imposed upon or introduced to the pendulum by means of a coupling and no direct attachments to the pendulum are employed. Two suitable types of couplings are shown in the drawings. The preferred type is the magnetic type in which the compensating force is introduced to the pendulum by rotating damping magnets in a direction opposite to the forces imposed upon the pendulum by acceleration or deceleration. The resultant movement of the magnetic flux across the rim of the pendulum imposes a force upon the pendulum equal to and opposite in direction to the force imparted to the pendulum by the vehicle acceleration or deceleration. In this embodiment the force is due to the magnetic flux imposed upon the rim of the pendulum.

In the embodiment shown in Fig. 12 the support elements 300 replace the magnets 46 and carry a ring member 301. This ring member serves as an impeller creating a fluid turbulence between the pendulum and the member due to the air drag created by relative movement of the member and pendulum. Where required a roughened or striated surface may be used on the confronting surfaces of the pendulum and member 301. In some instances the weight of the pendulum may require the use of vanes on the confronting surfaces of member 301 and the pendulum rim. It is to be understood that a fluid coupling employing a hydraulic liquid can be used in this connection.

Referring back to the preferred compensator, a magnet carrier disc 45 carrying permanent magnets 46 is rotatably mounted coaxially with the pendulum. It is then necessary to rotate the disc 45 proportional to the acceleration and in the proper direction sense.

The device for deriving the acceleration component of the car's motion consists of a flat disc 47 carried on the upper end of shaft 48. Spiral gears 49 at the intersecting ends of shafts 48 and 28 provide a connection between the constant speed motor 24 and disc 47. Roller 50 is rotatably mounted above disc 47 and ball cage assembly 51, similar to the assembly 33 heretofore described, serves as a connection between the disc and roller to drive the roller in a direction and speed dependent upon the position of the cage 51. The cage is carried and positioned by rod 52. The other end of rod 52 operates within a spiral cam groove 53a in cam roller 53. Shaft 54 extends axially through roller 53 and the right hand end of the shaft is inter-connected with roller 50 through a planetary or differential gear assembly. Gear 55 engages gear 56 which is keyed to the shaft carrying the cage or planetary gear 57 of the differential system consisting of gears 57, 58 and 59. Gear 58 is rotationally connected with roller 50. Gear 60 is attached to gear 59 both of which are rotatably carried upon the shaft to which gear 56 is keyed. Gear 60 in turn is connected to the vehicle wheel 61 through the gear assembly 62, a flexible drive connection 63 and gear assembly 64. The magnetic clutch 65 is interposed in this connection for reasons to be hereinafter explained in connection with the limit switches.

The arrangement is such that the planetary gear 57 rotates the crank arm to turn gear 56 only when wheel 61 accelerates or decelerates. Thus cam roller 53 is rotated only during periods of acceleration of the vehicle. The construction is such that rod 52 shifts the ball cage 51 to govern the speed of rotation of roller 50 in proportion to the speed of the car.

A spiral gear assembly 66 serves to rotate disc 45 in proportion to the acceleration or deceleration of the vehicle as the rotation of roller 53 is proportional thereto.

Angle corrector and sine converter

The above description completes that part of the apparatus relating to the mounting of the pendulum and the compensation for forces that are imposed upon the pendulum other than the true gravitational force. It now remains to correct for the angle deviation of the frame of the apparatus relative to the unsprung vehicle chassis. The corrected angle may then be converted into its sine and integrated over the distance traveled by the vehicle between selected limits. The angle between the pendulum and the case of the apparatus for spring suspended vehicle body is represented by the rotation of roller 31 and shaft 32 which controls the follow-up system. However, this angular motion does not represent the true angle of the road and must be corrected for the attitude of the spring suspended body with respect to the unsprung portion of the chassis. The principle employed is that the follow-up arm measures the angle between the frame of the apparatus and the pendulum. A linkage between the frame of the apparatus and the unsprung chassis measures the angle between the unsprung chassis and frame, thus eliminating all other forms of vibration, except this angular difference.

Of course the unsprung portion of the chassis on the conventional car consists usually of merely the axles and the wheels with no connection with the vehicle body other than through the spring system. A longitudinal reference bar must therefore be provided for connecting the linkage of the parallel arm system from the elevation measuring device. This reference bar must not be subject to strains or distortions by the weaving or twisting of the axles and must maintain a fixed relationship with the contact surface of the roadway with at least one pair of wheels including one front and one rear wheel.

The preferred manner of accomplishing this is illustrated in Fig. 1. A reference bar 68 is provided with flat surfaces adjacent its ends. The flat surfaces rest on the radius surfaces 303 of the front and rear axles 304 of the vehicle. The reference bar is held in contact with the radius surfaces of the axles by springs 305 and fastening rods 306. The springs 305 have sufficient tension to hold the reference bar against the surfaces even when traveling over rough roads. The arrangement permits free twisting or weaving of the axles without affecting the linear relationship of bar 68 relative to the contact surfaces of the tires with the roadway or ground surface.

The bar 68 is connected to the parallel arm mechanism including rod 67. Thus, means is provided for correcting for the angular deviation between the spring mounted apparatus frame and the unsprung vehicle chassis.

This difference is algebraically added to the measured angle represented by rotation of shaft 32 before the sine computer whereby the true angle is continuously and instantaneously fed into the sine computer.

This is accomplished by a differential gear assembly and a parallel arm straight line system similar to the well known universal drafting machine. The parallel arm system is arranged to transmit angular variations to the crank arm or cage in which the planetary gear is mounted while the rotation of shaft 32 is introduced to the input gear of the differential.

The parallel arm system 67 is attached to the unsprung chassis represented by the rod 68. The arm 67a of the parallel arm system has rigid connection with shaft 69 and the angular motion is introduced into gear 70 keyed to the end of the shaft. Gear 70 meshes with pinion 71 carried by arm 72, the other extremity of which carries a planetary gear 73. The right end of shaft 32 is keyed to input gear 74 of the differential. The angular movement of the output gear 75 of the differential represents the true instantaneous angle between the pendulum and unsprung chassis or rod 68. This angular displacement is transmitted to gear 76 through the pinion gear 77 which is rigidly secured to gear 75. It is to be understood that gears 75 and 77 are rotatably mounted on arm 72. The ratio of gears 77 and 76 is adjusted to compensate for the reduction in the angular displacement of shafts 32 and 72 relative to the follow-up system and the parallel arm system whereby the angular displacement of gear 76 is that of the true angle.

The actual sine converter includes the roller 78 mounted on gear 76 and the frame and bar assembly 79. The end bar 79a of this assembly abuts roller 78. Suitable means such as springs are provided to hold the bar in contact with the roller. In the interest of simplicity the springs are omitted from the diagrammatic figure but are shown at 238 of Fig. 3 in the embodiment illustrated therein and will be hereinafter more fully described. Rotation of the gear 76 results in a linear reciprocal motion of the assembly 79 proportional to the sine of the angle. This linear motion is introduced into an integrator by means of rod 79b which carries a ball cage in a manner to be hereinafter explained.

Integration mechanism

The description of the apparatus has now progressed to the step of integrating the sine of the instantaneous angle times the derivative of the distance traveled by the vehicle between selected limits or in other words, between the points on the earth's surface for which the elevation differential is sought. The mechanism for accomplishing this is another adaptation of the rotating disc, balls and roller previously explained in connection with other parts of the apparatus.

The disc 80 is connected to the shaft which carries roller 50 through shaft 81 on which the disc is keyed by the gear assembly 82. It will be recalled that the rotation of roller 50 is proportional to the speed of the car. Therefore, the rotation of disc 80 is also proportional to the vehicle velocity. The ball cage 83 is connected to rod 79b and is thus positioned relative to the rotating disc 80 and is dependent upon the sine of the true angle. The resultant rotation of roller 84 is then introduced into counter 85 by spiral gear and shaft assembly 86.

The counter is calibrated to the apparatus constant and the difference in the reading at the base or other selected initial point and the reading at any other selected or final point represents the elevation differential between the selected limits.

It is to be understood that in lieu of counter 85 or in addition to the counter 85 the motion of roller 84 may be imposed upon a graph or chart. The preferred means of accomplishing this will be hereinafter more fully explained in connection with Figures 9 to 11 inclusive.

Limit switches

Obviously in operation the speed of the vehicle as well as the angle of the unsprung chassis relative to the horizontal should be maintained within certain limits depending upon the characteristics or setting of the apparatus. The limit switches to be described provide a protective system which disconnects the drive and lights a signal lamp or energizes any other suitable alarm when either the speed limit is exceeded or when too steep an angle is encountered. In such cases the operator must go back to the last station of known elevation and re-survey after making the requisite adjustments of the apparatus.

The means of accomplishing this comprises the magnetic clutch 65, an electrical circuit including an alarm 87, limit switches 88 responsive to lug 79c carried by the sine converter frame 79 and limit switch 89 responsive to the upturned portion of rod 52 of the acceleration compensator. A single source of electrical energy 90 may be utilized to energize the constant speed motor 24, the magnetic clutch 65 and the limit switches 88 and 89. In operation the limit switches are normally open and switch 91 is normally closed. A relay 92 makes electrical connection with that part of the circuit energizing the magnetic clutch. The arrangement is such that when either of the limit switches 88 or 89 are closed the relay is energized breaking the connection to the magnetic clutch and making connection with the alarm 87.

Charting mechanism

As indicated earlier in the description, the apparatus may utilize in place of the counter 85 a recording device which will draw a profile of the path traversed by the vehicle. However, it is usually preferable to utilize both the recording device and counter.

In most areas, substantial elevation differentials are encountered and in order to have a chart with a large scale the novel system of recording illustrated in Figs. 9 to 11 inclusive is required.

This system is based upon a recording apparatus that will plot a predetermined variation of altitude about the center line of the chart as indicated in Fig. 11. When the chart limit is reached by the marking element then the marker is automatically returned to the center of the record where it continues to plot the elevation variations. A convenient make up for the chart is shown, that is, the distance from the center line to the edges of the chart represents variation of ten feet (10′) in altitude. With this scale the difference in elevation can be determined merely by adding ten feet (10′) to the reading for each excursion return from the upper edge of the chart and subtracting ten feet (10′) for each return from the lower edge of the chart. The arrangement permits the use of a large and constant chart scale with no limit as to the maximum variations in elevation encountered.

The charting mechanism includes the chart roller 93, the shaft of which is rotatably interconnected with wheel 61 of the vehicle through gear 94 which meshes with one of the gears of the assembly 62 as indicated in Fig. 1. Thus, the chart is rotated according to the speed of the vehicle. The mechanism for controlling the marker 94 includes the pulley wheels 95 and 96. Wheel 95 is rotatably connected to the shaft on which roller 84 is mounted. Around the pulleys is an endless belt or chain 97, having wedge shaped protrusions or carriers 97a. The spaces between the apexes of the wedges are exactly the same as the distance from the center of the chart to either edge. Support arms 98 carry guide rods 99 and 100. On each of the rods are slidably mounted bushings 101 and 102. Mounted between the bushings is the marker carrier 103 on which marker 94 is mounted. Extending from and pivoted to the end of the carrier is a latch 104. The latch has a web shaped recess for receiving the wedges 97a. The latch has beveled edges 104a at each side. When the chain or belt 97 carries the latch and bushing mechanism to either side to the point that the marker reaches the edge of the chart, the tapered ends of arms 105 engage the tapered surfaces 104a of the latch, lifting the latch from the particular wedge 97a upon which it has been positioned. When thus released the springs 106, attached between the bushings and supports 98 return the bushings and latch assembly to the center position where another wedge 97a is engaged by the latch recess.

It is believed that the operation of this charting mechanism is apparent from the foregoing description. The pulley wheel 95 is rotated by the integral roller 84 in proportion to the elevation variation. The marker carrier 103 due to the connection between latch 104 and belt 97 is moved along a line normal to the chart axis as it passes over roller 93. The roller is advanced past the marker in proportion to the speed of the vehicle. When a variation in either direction is encountered greater than the distance represented by one half (½) the chart width, the marker makes a rapid excursion back to the center line of the chart and recording is continued to produce the saw-tooth type chart illustrated in Fig. 11.

It is contemplated that servomotors may be employed in place of all or either of the power devices shown in the form of the rotating disc, roller and ball cage assemblies, as will be understood by those skilled in the art. However, the assemblies shown are preferred as they substantially eliminate the necessity of intricate electrical arrangements.

The preferred embodiment

The preferred embodiment illustrated in Figs. 2 to 8 inclusive of the drawings will now be considered. The base platform 200 serves as a support for the device on which the mechanism described in conjunction with Fig. 1 is mounted. Upright pedestal 201 has at its upper end a bearing in which the shaft for follow-up arm 16 is journaled. Photoelectric cell carrier 19 is mounted on the follow-up arm adjacent its shaft and housed within the carrier are photoelectric cells 17 and 18. The pendulum 15 has a ball bearing mounting best shown in Fig. 5. The support for the mounting includes arm 202 secured to the follow-up arm by frame 203. The rods 203a of the frame extend through the cutaway portions of the pendulum. The arm 202 has an inverted U-shaped portion 202a and the shaft of the pendulum extends across the arms of the U-shaped portion 202a, having ball bearing mountings 204 at each end. Support 202 is hollow which permits insertion of the bearing carrier pin 205. This pin is threaded to the hollow support.

Disc 45 which carries the magnets 46 of the acceleration compensator has a central shaft 45a. The shaft has a ball bearing mounting in the upper end of pedestal 206. The spiral gear assembly 66 and the drive assembly therefore will be hereinafter discussed.

Disc 45 carries a cylindrical portion 45b. This cylindrical portion carries the magnets 46 and in conjunction with the disc serves as a light box supplying light to photo cells through the upper cut-away portion of pendulum 15. The lamp 20 which supplies the light to the box through the lower cut-away portion of the pendulum is supported from arm 16 by bracket 207. The magnets 44 are connected through braces 43 to the rods 203a.

Figure 2:
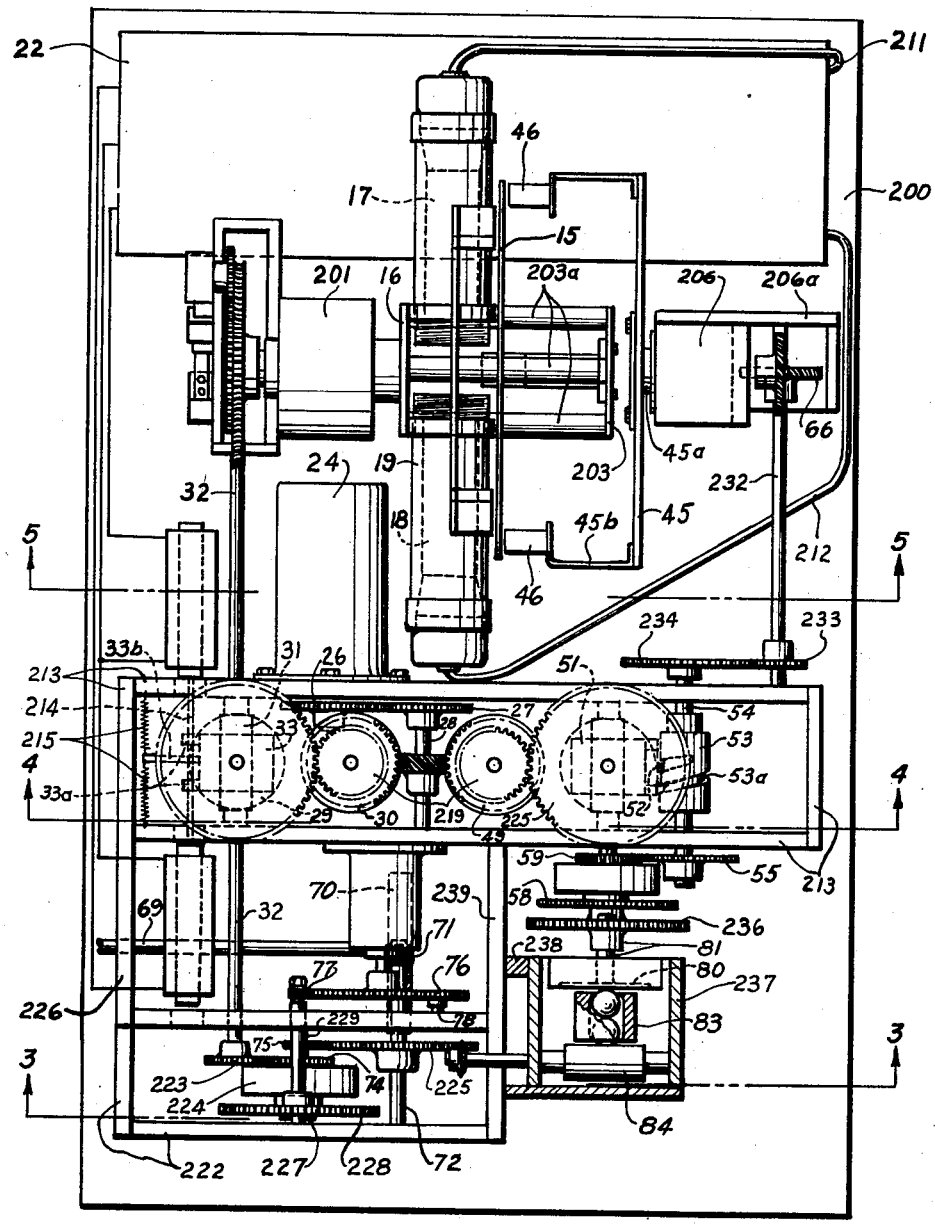
Fig. 2 is a plan view, with parts removed for clarity, of the preferred embodiment of this invention.

The gears for rotating the follow-up shaft and system are illustrated in Figs. 2, 5 and 6. Gears 35 and 36 are rigidly connected to the follow-up shaft. The lower portion of these gears operate within case 208. Shaft 32 is journaled in the ends of the case. Gears 40 and 41 are mounted on the shaft 209 which is in turn journaled in case 208. Gear 39 is rotatably carried by an assembly 210 mounted by means of spring 42 to the case. The amplifier 22 is mounted on platform 200 and is connected by cables 211 and 212 to the electric eyes 17 and 18, respectively.

An upright boxlike partition 213 provides a support for the servomotor or solenoid 23. The active ends of the solenoid extend on either side of the boxlike partition. The rod of the solenoid passes through openings in the walls of the partition. The ball cage 33 has ears 33a having a slidable connection upon rod 214, the ends of which are secured to the walls of partition 213. This sliding connection on the rod supports both the ball cage and solenoid. An arm 33b extends from ball cage 33 and is attached to the ends of springs 215. These springs urge the ball cage toward its neutral position relative to disc 29. Disc 29 is mounted for rotation within bracket 216, secured to the partition 213.

Motor 24 is mounted on the outside of partition 213. Somewhat different gear arrangement is illustrated in this embodiment from that shown in the schematic drawing of Fig. 1 for transmitting driving power from the motor to disc 29. The gear 26 attached to the motor arbor and gear 27 meshing therewith are mounted within partition 213. Drive shaft 28 and the spiral gears 30 and 49 are combined to drive shaft 48 and the shaft 217. These shafts are journaled in brackets 218 which are removably secured to bracket 216 and the partition 213. Meshing gears 219 and 220 serve to transmit the driving power to disc 29.

To simplify the description it may be said at this point that disc 47, which comprises a part of the disc, ball and roller assembly 47, 51 and 50 of the accelerated compensation device is similarly mounted in the boxlike partition 213 as illustrated. Similar gears, shafts and brackets are designated by like numerals. A guide pin 221 extends in each instance from brackets 218 into a horizontal groove in ball cages 33 and 51 for added support.

Shaft 32 on which roller 31 is mounted is journaled in the walls of partition 213 and at one end is journaled in and extends through the walls of another upright boxlike partition 222. Gear 74 of the differential is driven from shaft 32 by means of pinion gear 223. The planetary gears of this differential are attached to the cage 224 of the differential and are not visible in the drawing. Gear 75 of the differential meshes with an intermediate gear 225 keyed to the same shaft as is spiral gear 71, which in turn meshes with gear 70. Shaft 69 to which gear 70 is keyed extends through the partition 226 intermediate box-like partitions 213 and 222. This shaft has an operable connection through parallel arm and straight line mechanism 67, not shown in the drawings, to the unsprung vehicle chassis. In this embodiment the gear 77 is connected to the output gear 75 of the differential through gears 227, 228, shafts 229 and 230. These shafts, as well as shaft 72, are journaled in the walls of partition 22.

The description has now progressed to the mechanism for driving the acceleration compensator and more particularly to the disc roller and ball cage assembly and related parts designated by numerals 47, 50 and 51, respectively, the mounting of which has been heretofore explained. It will be seen that shaft 54 carrying cam roller 53 is journaled in the walls of partition 213 in such fashion that the cam slot 53a of the roller engages the lug or rod 52 attached to ball cage 51. Roller 50 is connected to the vehicle wheel, not shown in the drawings, by spiral gear assembly 64 detailed in Fig. 8. These gears and the shafts on which they are mounted, as well as the magnetic clutch 65, are mounted within box 231 which in turn is mounted on platform 200.

In this embodiment the differential gear connection between roller 51, the magnetic clutch and cam roller 53 is reversed compared to the illustration of Fig. 1. In other words, gear 60 driven by the magnetic clutch meshes with the input gear 58 of the differential. While the shaft on which roller 50 is mounted is connected to the differential cage, the output gear 59 meshes with gear 55 to drive the cam roller 53. The connection between the spiral gear assembly 66 for driving the acceleration compensator disc 45 is connected to the cam roller through shaft 232, and gears 233 and 234. Shaft 232 is mounted for rotation between the wall of partition 213 and bracket 206a carried by pedestal 206.

The shaft on which roller 50 is mounted extends through the differential whose input and output gears are designated as 58 and 59, respectively. The gear assembly 82 of Fig. 1 is replaced by gear 235 keyed to the roller shaft. Gear 235 meshes with gear 236 mounted thereabove. Shaft 81 on which gear 236 is rigidly mounted is journaled in frame 237 which frame is attached by a suitable bracket 238 to partition 239, extending vertically from platform 200. Frame 237 also serves as a mounting for the disc, ball and roller assembly designated by numerals 80, 83 and 84, respectively.

Figure 3:
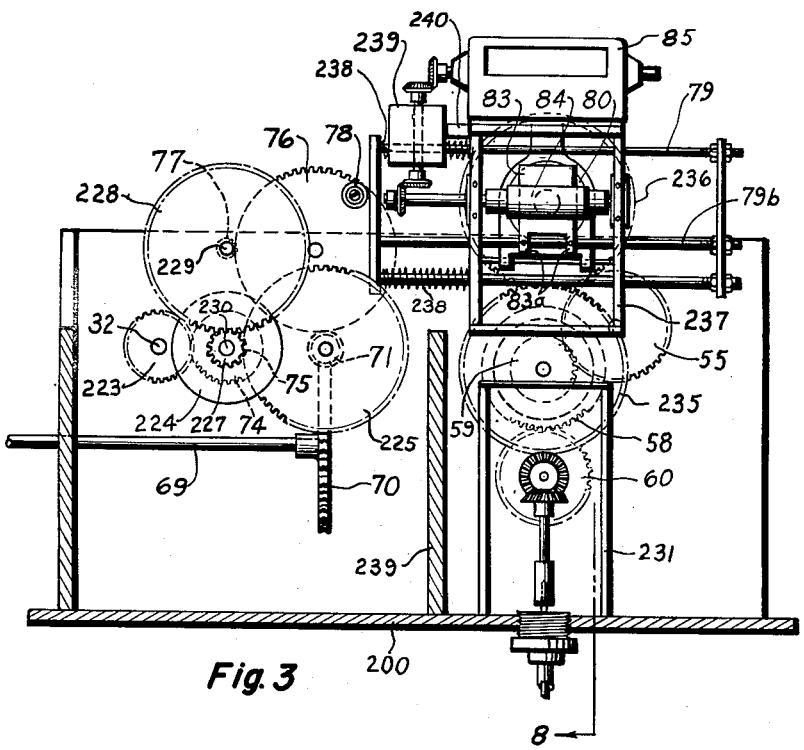
Fig. 3 is a view taken along the line 3—3 in Fig. 2 in the direction of the arrows.
Figure 4:
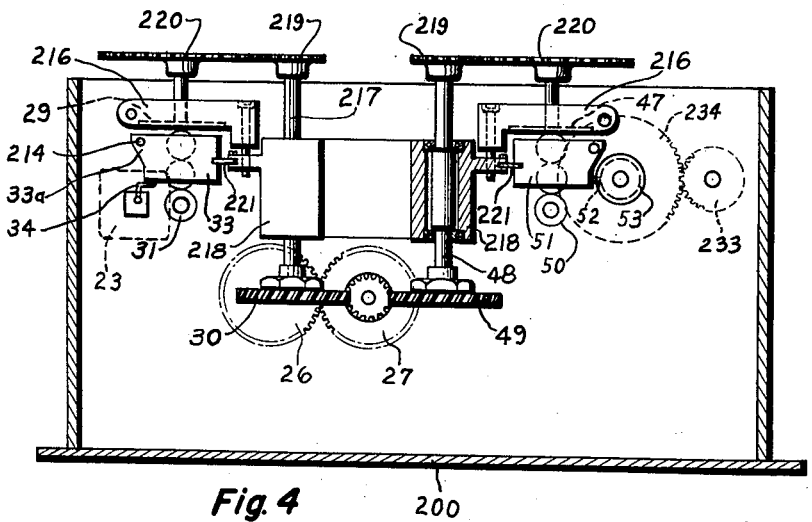
Fig. 4 is a view taken along the line 4—4 in Fig. 2 in the direction of the arrows.
Figure 8:
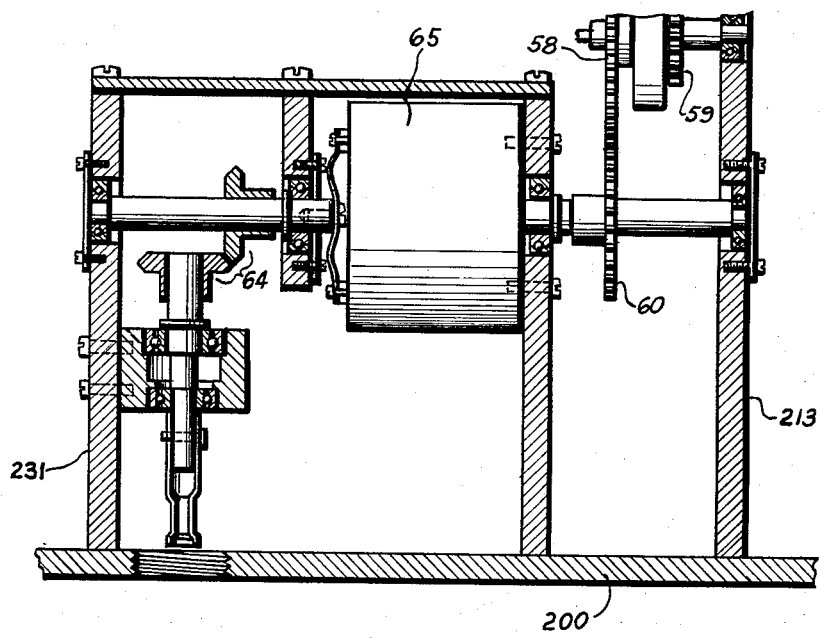
Fig. 8 is a view taken along the line 8 in Fig. 3 in the direction of the arrows, and illustrating the magnetic clutch assembly.

Frame 237 slidably supports the sine computer frame 79 as shown in Fig. 3. The rod 79b of the frame is connected to the ears 83a of the ball cage to control its position relative to disc 80. Springs 238 urge roller bar 79a into engagement with roller 78.

Counter 85 is mounted on frame 237. The gear drive between the counter and output shaft of roller 84 is supported by cage 239 attached to frame 237 by bracket 240.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having described my invention, I claim:

1. In a device for determining differences in elevation between separate points on the earth's surface a pendulum in the form of an unsymmetrical disc operably mounted to provide a vertical reference co-ordinate, an acceleration compensator including a magnet carrier rotatably mounted in axial alignment with the pendulum, magnets connected to the carrier in such manner as to impose a magnetic flux about the pendulum rim and means to rotate the carrier solely in response to acceleration and deceleration of the device, the directional sense of rotation in each instance being opposite to that which would be imparted to the pendulum by such acceleration change, the arrangement of the magnets and the means to rotate the carrier being such as to provide a torque acting on the pendulum equal and opposite to that due to acceleration or deceleration of the instrument.

2. In a device for determining differences in elevation between separate points on the earth's surface, a pendulum in the form of an unsymmetrical disc operably mounted to provide a vertical reference co-ordinate, an acceleration compensator including a rotatable member mounted coaxially with the axis of movement of said pendulum, means to drive and rotate the member solely in response to the acceleration of the device and in a directional sense opposite to that which would be imparted to the pendulum by such acceleration, magnets carried by the member in close proximity of the peripheral rim of the pendulum disc so as to impose a magnetic flux about the rim of the pendulum, the arrangement of the magnets and the means to rotate the member being such as to provide a torque acting on the pendulum equal and opposite to the torque acting thereon due to acceleration or deceleration of the instrument.

3. In a device for determining differences in elevation between separate points on the earth's surface, a pendulum in the form of an unsymmetrical disc operably mounted to provide a vertical reference co-ordinate, an acceleration compensator including a rotatably mounted member, magnets carried by the member and disposed about and closely adjacent the peripheral rim of the pendulum disc, and linkage including a differential gear system having its output gear connected with the member to rotate the member and its input gears connected respectively with a wheel upon a vehicle upon which the device may be mounted and a gear adapted to rotate at a rate responsive to the instantaneous speed of the vehicle, the linkage and mounting of the member being such that rotation of the output gear will rotate the member in a directional sense opposite to the torque on the pendulum due to acceleration, the arrangements of the magnets and the linkage for rotating the member carrying the magnets being such as to provide a torque acting on the pendulum equal and opposite to the torque acting thereon due to acceleration and deceleration of the instrument.

4. In a device for determining differences in elevation between separate points on the earth's surface, a pendulum in the form of an unsymmetrical disc operably mounted to provide a reference co-ordinate, an acceleration compensator including a member rotatably mounted coaxially with the axis of movement of said disc, magnets carried by the member and disposed about and closely adjacent the peripheral rim of said disc and means to rotate said member in response to acceleration of the device and in a rotative direction opposite to that which the acceleration tends to urge said disc including a differential gear system having its output gear connected with said member to rotate the same and having a first input gear connected with a wheel of a vehicle upon which the device may be mounted and a second input gear connected with means for driving the same at a rate proportional to the speed of the vehicle including a connection between the output gear and the driving means for changing the rate at which the second input gear is driven by said means proportionally to a change in rate of rotation of said first input gear, the arrangement of the magnets and the means for rotating said member being so proportioned as to provide a torque acting on said disc equal and opposite to the torque acting thereon due to acceleration and deceleration of a vehicle which may carry the device.

RAYMOND T. CLOUD.

REFERENCES CITED

The following references are of record in the file of this patent:

UNITED STATES PATENTS

| Number | Name | Date |
|---|---|---|
| 95,758 | Barton | Oct. 12, 1869 |
| 624,268 | Uehling | May 2, 1899 |
| 681,835 | Soldona | Sept. 3, 1901 |
| 1,100,698 | Stoddard | June 16, 1914 |
| 1,542,809 | Alexander et al. | June 23, 1925 |
| 1,567,347 | Van Lynden | Dec. 29, 1925 |
| 1,571,820 | Turner | Feb. 2, 1926 |
| 2,176,807 | Wunsch | Oct. 17, 1938 |
| 2,224,954 | Eisle | Dec. 17, 1940 |
| 2,320,290 | McNatt | May 25, 1943 |
| 2,362,616 | Cloud | Nov. 14, 1944 |
| 2,381,225 | Newell | Aug. 7, 1945 |
| 2,429,620 | Harrington | Oct. 28, 1947 |

FOREIGN PATENTS

| Number | Country | Date |
|---|---|---|
| 230,186 | Great Britain | 1925 |
| 404,303 | Great Britain | 1934 |
| 530,764 | Germany | 1931 |